United States Patent
Leist

(10) Patent No.: US 6,861,009 B1
(45) Date of Patent: Mar. 1, 2005

(54) DEICING COMPOSITIONS AND METHODS OF USE

(76) Inventor: E. Greg Leist, 2611 S. Yarrow St., Lakewood, CO (US) 80227

( * ) Notice: Subject to any disclaimer, the term of this patent is extended or adjusted under 35 U.S.C. 154(b) by 12 days.

(21) Appl. No.: 10/384,177

(22) Filed: Mar. 6, 2003

(51) Int. Cl.$^7$ ................................................. C09K 3/18
(52) U.S. Cl. .......................................... 252/70; 106/13
(58) Field of Search ............................. 252/70; 106/13

(56) References Cited

U.S. PATENT DOCUMENTS

| | | | | |
|---|---|---|---|---|
| 3,711,409 A | * | 1/1973 | Ayres et al. ................... | 252/70 |
| 4,585,571 A | | 4/1986 | Bloom ......................... | 252/70 |
| 4,668,416 A | | 5/1987 | Neal ........................... | 252/70 |
| 4,676,918 A | | 6/1987 | Toth et al. .................... | 252/70 |
| 4,986,925 A | | 1/1991 | Fiske .......................... | 252/70 |
| 5,635,101 A | | 6/1997 | Janke et al. ................... | 252/70 |
| 5,645,755 A | | 7/1997 | Wiensenfeld et al. .......... | 252/70 |
| 5,876,621 A | | 3/1999 | Sapienza ...................... | 252/70 |
| 5,919,394 A | | 7/1999 | Janke et al. ................... | 252/70 |
| 5,942,150 A | * | 8/1999 | Heuer et al. .................. | 252/70 |
| 5,965,058 A | | 10/1999 | Janke et al. ................... | 252/70 |
| 5,980,774 A | | 11/1999 | Sapienza ...................... | 252/70 |
| 6,080,330 A | | 6/2000 | Bloomer ....................... | 252/70 |
| 6,129,857 A | | 10/2000 | Sapienza ...................... | 252/70 |
| 6,149,834 A | * | 11/2000 | Gall et al. .................... | 252/70 |
| 6,156,277 A | | 12/2000 | Leibacher et al. ............. | 252/70 |
| 6,315,919 B1 | | 11/2001 | Sapienza ...................... | 252/70 |
| 6,416,684 B1 | | 7/2002 | Bloomer ....................... | 252/70 |
| 6,440,325 B1 | | 8/2002 | Hartley et al. ................ | 252/70 |
| 6,605,232 B1 | * | 8/2003 | Montgomery et al. ......... | 252/70 |

FOREIGN PATENT DOCUMENTS

WO      WO 01/46334 A1    *   6/2001

OTHER PUBLICATIONS

Derwent Abstract No. 1983–09833K, abstract of German Patent Specification No. 156919A (Sep. 1982).*

* cited by examiner

*Primary Examiner*—Anthony J. Green
(74) *Attorney, Agent, or Firm*—Sheridan Ross P.C.

(57) ABSTRACT

The invention provides a non-corrosive deicing composition containing a deicing component, a corrosion inhibitor and a protein solution having a pH adjusted to between about pH 5 and about pH 7. Optionally, the deicing composition contains a corrosion inhibitor as well. The invention also provides a method of removing snow and ice from a road surface by applying these deicing compositions to the ice or snow.

20 Claims, No Drawings

DEICING COMPOSITIONS AND METHODS OF USE

FIELD OF THE INVENTION

The invention lies in the field of deicing compositions suitable for making surfaces free of snow and ice and to methods of using these compositions.

BACKGROUND OF THE INVENTION

Most northern cities incur considerable yearly expense in the removal of snow and ice from streets and other outdoor surfaces to meet the winter time needs of business, industry, and the public in general. Reliance on mechanical means of snow or ice removal alone, however, is insufficient, necessitating the use of deicing salts. Rock salt or sodium chloride is the most common chemical used for deicing, primarily because of its low cost, ease of transportation, and readily dispersible form.

The cost of the prior art deicing salts, including sodium chloride, calcium chloride, magnesium chloride, or rock salt, are deceptively low given the unassumed cost of corrosion to metal guardrails, bridge supports, metal concrete reinforcing rods and automobiles. As such, these chemicals ultimately cost the consuming public far more in corrosion damage than the initial material cost would indicate. In order to overcome these corrosive properties, chemicals such as ammonium sulfate, ammonium nitrate, ammonium chloride, urea, alcohols and glycols have been tested as replacements for the corrosive salts. While these chemicals reduce corrosion, they are more expensive, difficult to apply and carry hidden costs in the form of environmental pollution and toxic properties.

In searching for chemicals that can be used to melt ice and snow without causing corrosion or pollution, the preferable chemicals should have suitable water solubility, be inexpensive to produce on an industrial scale and be applicable by generally known means and equipment. For these reasons, many deicing compositions have been proposed that contain protein from food, beverage or agricultural waste streams. For example, deicing compositions have been proposed that contain byproducts from the production of cheese and milks, waste concentrates from the alcohol distilling industry, byproducts of sulfite pulp mills, solubles that settle during the fermentation of wines, and the like. These compositions also contain corrosive salts but the protein sources appear to reduce the corrosive effects of the salts while maintaining the ice- and snow-melting properties. Additionally, the protein components reduce the need for additional corrosion inhibitors in the deicing compositions. Unfortunately, the addition of proteins to deicing solutions causes many problems with handling and stability characteristics of the solutions. Typically, the protein sources are difficult, if not impossible to get fully mixed with the other components of the deicing compositions. Further, any deicing composition that is made containing a protein component often forms precipitates and/or flocculates during storage prior to use and during use as well. If the proteins do not come completely out of solution to form a precipitate or flocculate, they still often form gels that cause gelling of the deicing composition and impair the ability to evenly apply and distribute the deicing compositions.

Thus, there exists a need for protein-containing deicing compositions with good handling and anticorrosive properties that maintain the ability to melt snow and ice from outdoor surfaces.

SUMMARY OF THE INVENTION

In one embodiment, the present invention is a deicing composition that includes, a deicing component, a corrosion inhibitor and a protein solution having a pH adjusted to between about pH 5 and about pH 7. The deicing component can be alkali metals or alkaline earth metal chlorides, metal sulfates, phosphates, nitrates, amides, alcohols, glycols, long-chain amines, ammonium sulfate, ammonium nitrate, ammonium chloride, urea, glycerol, potassium carbonate, potassium bicarbonate, potassium acetate, sodium chloride, calcium chloride, magnesium chloride, calcium formate, calcium magnesium acetate, or sodium dichromate. The deicing component can be between about 20% and about 30% of the deicing composition. The corrosion inhibitor can be zinc, antimony, manganese, cadmium, nickel, cobalt, tin, aluminum, amines, carbohydrates, gluconates, acetates or citrates and preferably is triethanol amine. The corrosion inhibitor can be between about 0.05% and about 0.5% of the deicing composition. In an alternative embodiment, the composition can include a complex carbohydrate component.

The protein can be derived from a source selected from the group consisting of pork hides, pork hooves, beef hides, beef hooves, grain protein and forage protein. The protein can be at least partially digested, such as by proteolytic enzymatic digestion. The protein solution can be prepared by mixing a solid protein material with water and heating the mixture to a temperature of between about 40° C. and about 82° C. prior to adjusting the pH. The protein solution can comprise between about 0.001% and about 0.2% of the deicing composition.

In a specific embodiment, the present invention includes an aqueous deicing composition comprising about 29% $MgCl_2$, about 1% triethanol amine, and about 0.1% protein solution having a pH adjusted to between about pH 5 and about pH 7.

In a further embodiment, the present invention includes an aqueous corrosion inhibiting composition, comprising triethanolamine and protein solution having a pH adjusted to between about pH 5 and about pH 7.

In another embodiment, the present invention includes a method of removing snow and ice from a road surface comprising applying to the snow and ice a deicing composition, comprising a deicing component, a corrosion inhibitor and a protein solution having a pH adjusted to between about pH 5 and about pH 7.

DETAILED DESCRIPTION OF THE INVENTION

The deicing compositions of the present invention comprise deicing components, corrosion inhibitors and proteins in water in proportions effective to melt ice and snow while minimizing or eliminating corrosive degradation of metal surfaces that come in contact with the compositions. The deicing compositions of the present invention contain protein components that have been fully or partially digested. In another aspect of the present invention, the deicing compositions contain protein components that have been neutralized. The proteins used in these aspects of the present invention reduce the corrosive properties of other deicing components and have additive effects to any corrosion inhibitors included in the deicing compositions, in addition to improving the handling and stability of the compositions.

Deicing components suitable for use in the present invention include, but are not limited to, alkali metal or alkaline earth metal chlorides, metal sulfates, phosphates, nitrates, amides, alcohols, glycols, long-chain amines, ammonium sulfate, ammonium nitrate, ammonium chloride, urea, glycerol, potassium carbonate, potassium bicarbonate, potassium acetate, sodium chloride, calcium chloride, magnesium chloride, calcium formate, calcium magnesium acetate, and sodium dichromate. These deicing components preferably constitute between about 20% and about 30% of the final deicing compositions of the present invention. All composition percentages given herein are on a weight basis. Preferably, the deicing components constitute between about 23% and about 30% of the deicing compositions. More preferably, magnesium chloride is used as the deicing component in an amount sufficient to provide between about 23% and about 30% of the final deicing compositions of the present invention. Most preferably, magnesium chloride is used as the deicing component in an amount sufficient to provide about 29% of the final deicing composition.

Corrosion inhibitors suitable for use in the present invention include, but are not limited to zinc, antimony, manganese, cadmium, nickel, cobalt, tin, aluminum, amines (e.g., TEA (triethanol amine), carbohydrates, gluconates, acetates and citrates. The amount of the corrosion inhibitor to be used in the deicing compositions of the present invention can vary widely depending on the strength of the corrosion inhibitor as well as cost or handling concerns associated with the different inhibitors. Typically, the corrosion inhibitor additive of the present invention constitutes between about 0.01% and about 1.0%, more preferably between about 0.05% and about 0.5%, and most preferably between about 0.25% and about 0.5% of the deicing compositions of the present invention.

The protein component of the present invention may be obtained from many sources. Inexpensive sources of protein suitable for use in deicing compositions of the present invention can be found in waste streams or byproducts of agricultural or livestock processes. Pork and beef hides and hooves are examples of useful sources of inexpensive protein for use in the deicing compositions of the present invention. Additionally, grain (e.g., corn and wheat) and forage proteins are useful in the producing the protein additives of the deicing components of the present invention. These protein additives can be first processed to neutralize the pH before partially or fully digesting them prior to combining them with the deicing and anti-corrosion components of the present invention. This digestion and neutralization makes the protein component of the deicing composition easier to mix with water or other deicing composition components. Further, this protein processing greatly improves the handling characteristics of the final deicing composition by reducing or eliminating physical characteristics previously seen with deicing compositions that included protein components. For example, the deicing compositions of the present invention that contain a neutralized or at least partially digested protein source are resistant to precipitation, flocculation and gelling that often occurs in protein-containing deicing compositions of the prior art. This results in deicing compositions having greater stability for prolonged periods between production and application on snow or ice-covered surfaces.

The protein component of the present invention is typically a liquid component having protein in solution, being a stable suspension of protein, or a combination thereof. As used herein, the term protein solution refers to such a liquid protein component. As used herein, reference to a stable suspension means a suspension that maintains a uniform dispersion of the protein under typical storage conditions for at least about a month, more preferably three months, more preferably six months and more preferably a year. Typically, a solid protein material is converted by mixing it with water and heating the mixture to a temperature of between about 40° C. and about 82° C. When the protein has been converted to a liquid protein source, the protein processing can then continue with neutralization and/or digestion of the protein in the protein solution. The protein is neutralized or adjusted to a pH of between about pH 5 and about pH 7. Preferably, the pH of the protein component is stabilized at about pH 6. As used herein, reference to adjusting and/or neutralizing the pH refers to determining the pH of a solution and if it is not within desired or selected limits, adjusting the pH to be within the limits. This neutralization can be performed by any methods commonly known in the art. For example, if the protein source is initially too alkaline, the pH can be lowered close to the desired pH by the addition of a weak acid. Conversely, if the protein source is initially too acidic; a weak base can be added to adjust the pH of the protein source to the desired pH. Protein solutions of the present invention typically have between about 10% and about 25% protein.

The protein source can also be partially or fully digested by the addition of one or more proteolytic enzymes. Preferably, nonspecific proteolytic enzymes such as trypsin, chymotrypsin, or the like are used to partially or fully digest the protein prior to the addition of the protein source to other components of the deicing compositions of the present invention. Preferably, the proteolytic enzyme used for the digestion is Alcalase® (Novozymes). The proteolytic enzyme is added to the protein source and incubated for a time sufficient to partially or fully digest the protein present in the protein source. The incubation is typically conducted between about 20° C. and about 60° C. Preferably, the incubation is conducted at room temperature. The incubation may continue for an indefinite period of time as there is no need to stop the digestion reaction prior to adding other components of the deicing compositions nor is there any need to separate or remove the proteolytic enzymes from the digested protein source prior to use in the deicing compositions.

The proteolytic enzyme may also be added directly to the deicing composition following the addition of the protein if the deicing composition includes components in which the proteolytic enzyme retains activity. In this way, the components of the deicing composition are combined and mixed and the proteolytic enzyme is added and allowed to digest the protein contained within the composition as long as the protein remains active. However, it may be difficult to first mix the undigested protein source with the other deicing composition components. For this reason, the preferred method is the partial or full proteolysis of the proteins prior to the addition of the protein source to the deicing composition.

Hydrolyzed proteins may also be purchased commercially for use in the deicing compositions of the present invention although the cost of these commercial sources makes them expensive for use and distribution on a large scale.

The processing of the protein component can be performed in any order although, when conducted, the neutralization processing is preferably performed first as most proteolytic enzymes have a higher digestive activity at the more neutral pH.

The protein component of the deicing compositions is typically present in an amount constituting between about 0.001% and about 0.2% of the final composition and more preferably, between about 0.01% and about 0.15%.

Optionally, the deicing compositions of the present invention may also include a carbohydrate component. The addition of the carbohydrate component lowers the temperature at which the deicing compositions of the present invention are effective in aiding the removal of snow or ice. Thus, the addition of the carbohydrate component is preferred in circumstances in which the temperature of the snow or ice covered surface to which the deicing composition is to be applied is much lower than about −1° C. or −6° C. Preferably, this carbohydrate component is a complex carbohydrate such as processed corn, sugar beets, processed forage crops (e.g., alfalfa) or soybeans. A preferred source of the complex carbohydrate is a carbohydrate mixture obtained from corn by soaking whole grain corn in water, milling and processing to remove starch, followed by heat and acid processes to convert starches to carbohydrates.

In a preferred embodiment of the present invention, the deicing composition contains an aqueous $MgCl_2$ deicing component and a corrosion inhibitor package containing TEA, protein and water. This embodiment of the invention is preferably produced by forming a corrosion inhibitor package containing between about 30% and about 60% by weight TEA, and between about 1% and about 15% by weight protein, with the remainder water. A separate stock $MgCl_2$ solution is then formed which contains between about 20% and about 35%, preferably between about 26% and about 30%, by weight $MgCl_2$ in water. The deicing composition is then formed by mixing about 1 part of the corrosion inhibitor package with about 99 parts of the $MgCl_2$ stock solution.

Another preferred embodiment of the present invention is a deicing composition containing a $MgCl_2$ deicing component, a carbohydrate component and a corrosion inhibitor package containing TEA, protein and water. This deicing composition is prepared by combining a complex carbohydrate mixture with the corrosion inhibitor package and the $MgCl_2$ stock solutions described above. Preferably, the final deicing composition contains between about 85% to about 90% of the $MgCl_2$ stock solution, between about 0.1% to about 2% of the corrosion inhibitor package and between about 5% and about 15% of the complex carbohydrate mixture.

A further aspect of the present invention provides a process for making road surfaces free of snow and ice, in which compositions of the present invention are applied onto the road surfaces. The composition is preferably applied onto the road surface from a moving vehicle in an amount of sufficient to reduce snow and ice. The handling and application of the deicing compositions of the present invention is greatly improved by the neutralized and digested protein component of the deicing compositions. This treated protein component prevents gelling and precipitation of the deicing compositions in the distribution machinery or on the road surfaces. The application of these deicing components to the road surface may be repeated as often as desired. The compositions greatly reduce the damage to metallic surfaces resulting from corrosion that is typically seen with deicing chemicals.

The following Examples are provided to illustrate embodiments of the present invention and are not intended to limit the scope of the invention.

EXAMPLES

Example 1

A deicing composition is prepared as follows. A corrosion inhibitor component is prepared by making a between 45% and 80% by weight TEA solution in water and mixing HydroTriticum WAA, a protein-based product used in the personal care industry and available from Croda Chemical, resulting in 3% to 10% by weight WAA in the TEA solution. Add this corrosion inhibitor component to a magnesium chloride solution at between 0.25% to 1.0% of the finished product.

Example 2

A deicing composition is prepared as follows. A corrosion inhibitor component is prepared by making a between 45% and 80% by weight TEA solution in water and mixing it with a protein source of animal byproducts such as hooves and horns. A granular form of the byproduct is obtained, usually a gelatin form, liquefied with water, pH adjusted and digested with enzymes. The resulting mixture has between 3% and 10% by weight of the protein solution in the TEA solution. Add this corrosion inhibitor component to a magnesium chloride solution at between 0.25% to 1.0% of the finished product.

Example 3

A deicing composition is prepared as follows. A corrosion inhibitor component is prepared by making a between 45% and 80% by weight TEA solution in water and mixing it with a protein source of animal byproducts such as hides. A granular form of the byproduct is obtained, usually a gelatin form, liquefied with water, pH adjusted and digested with enzymes. The resulting mixture has between 3% and 10% by weight of the protein solution in the TEA solution. Add this corrosion inhibitor component to a magnesium chloride solution at between 0.25% to 1.0% of the finished product.

Example 4

A deicing composition is prepared as follows. A corrosion inhibitor component is prepared by making a between 45% and 80% by weight TEA solution in water and mixing it with a protein source of a forage crop such as alfalfa. Raw, or green, alfalfa (either fresh from field or dried) is mixed with water and processed into a mulch that is acidified and centrifuged to extract liquid protein. The resulting mixture has between 3% and 10% by weight of the protein solution in the TEA solution. Add this corrosion inhibitor component to a magnesium chloride solution at between 0.25% to 1.0% of the finished product.

Example 5

A deicing composition is prepared as follows. A corrosion inhibitor component is prepared by making a between 45% and 80% by weight TEA solution in water and mixing it with a protein source of corn or soybean. Corn or soybean protein is extracted by milling the whole grain, removing germ (oils) and by processing extract liquid proteins. The resulting mixture has between 3% and 10% by weight of the protein solution in the TEA solution. Add this corrosion inhibitor component to a magnesium chloride solution at between 0.25% to 1.0% of the finished product. The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

What is claimed is:

1. A deicing composition comprising:
   a. a deicing component;
   b. a corrosion inhibitor; and,
   c. a protein solution having a pH adjusted to between about pH 5 and about pH 7.

2. The deicing composition of claim 1, wherein the deicing component is selected from the group consisting of alkali metals or alkaline earth metal chlorides, metal sulfates, phosphates, nitrates, amides, alcohols, glycols, ammonium sulfate, ammonium nitrate, ammonium chloride, urea, glycerol, potassium carbonate, potassium bicarbonate, potassium acetate, sodium chloride, calcium chloride, magnesium chloride, calcium formate, calcium magnesium acetate, and sodium dichromate.

3. The deicing composition of claim 1, wherein the deicing component is magnesium chloride.

4. The deicing composition of claim 1, wherein the deicing component comprises between about 20% and about 30% of the deicing composition.

5. The deicing composition of claim 1, wherein the deicing component comprises about 29% of the deicing composition.

6. The deicing composition of claim 1, wherein the corrosion inhibitor is selected from the group consisting of zinc, antimony, manganese, cadmium, nickel, cobalt, tin, aluminum, amines, carbohydrates, gluconates, acetates and citrates.

7. The deicing composition of claim 1, wherein the corrosion inhibitor is triethanol amine.

8. The deicing composition of claim 1, wherein the corrosion inhibitor comprises between about 0.05% and about 0.5% of the deicing composition.

9. The deicing composition of claim 1, wherein the corrosion inhibitor comprises between about 0.25% and about 0.5% of the deicing composition.

10. The deicing composition of claim 1, wherein the protein solution has been at least partially digested.

11. The deicing composition of claim 1, wherein the protein is derived from a source selected from the group consisting of pork hides, pork hooves, beef hides, beef hooves, grain protein and forage protein.

12. The deicing composition of claim 1, wherein the protein solution has a pH adjusted to about pH 6.

13. The deicing composition of claim 1, wherein the protein solution is prepared by mixing a solid protein material with water and heating the mixture to a temperature of between about 40° C. and about 82° C. prior to adjusting the pH.

14. The deicing composition of claim 1, wherein the protein has been digested with a proteolytic enzyme selected from the group consisting of trypsin and chymotrypsin.

15. The deicing composition of claim 1, wherein the protein solution comprises between about 0.001% and about 0.2% of the deicing composition.

16. The deicing composition of claim 1, further comprising a complex carbohydrate.

17. The deicing composition of claim 16, wherein the complex carbohydrate comprises between about 5% and about 20% of the deicing composition.

18. An aqueous deicing composition comprising:
   a. about 29% $MgCl_2$;
   b. about 1% triethanol amine; and
   C. about 0.1% protein solution having a pH adjusted to between about pH 5 and about pH 7.

19. The aqueous deicing composition of claim 18, further comprising between about 5% and about 20% complex carbohydrate.

20. A method of removing snow and ice from a road surface comprising applying to the snow and ice a deicing composition, comprising:
   a. a deicing component;
   b. a corrosion inhibitor, and
   c. a protein solution having a pH adjusted to between about pH 5 and about pH 7.

* * * * *